E. H. BICKLEY.
MEANS EMPLOYED IN PRODUCTION AND MATERIAL CONTROL SYSTEMS.
APPLICATION FILED JAN. 16, 1918.

1,350,955.

Patented Aug. 24, 1920.
2 SHEETS—SHEET 1.

Fig.1.A

INVENTOR
E. H. Bickley

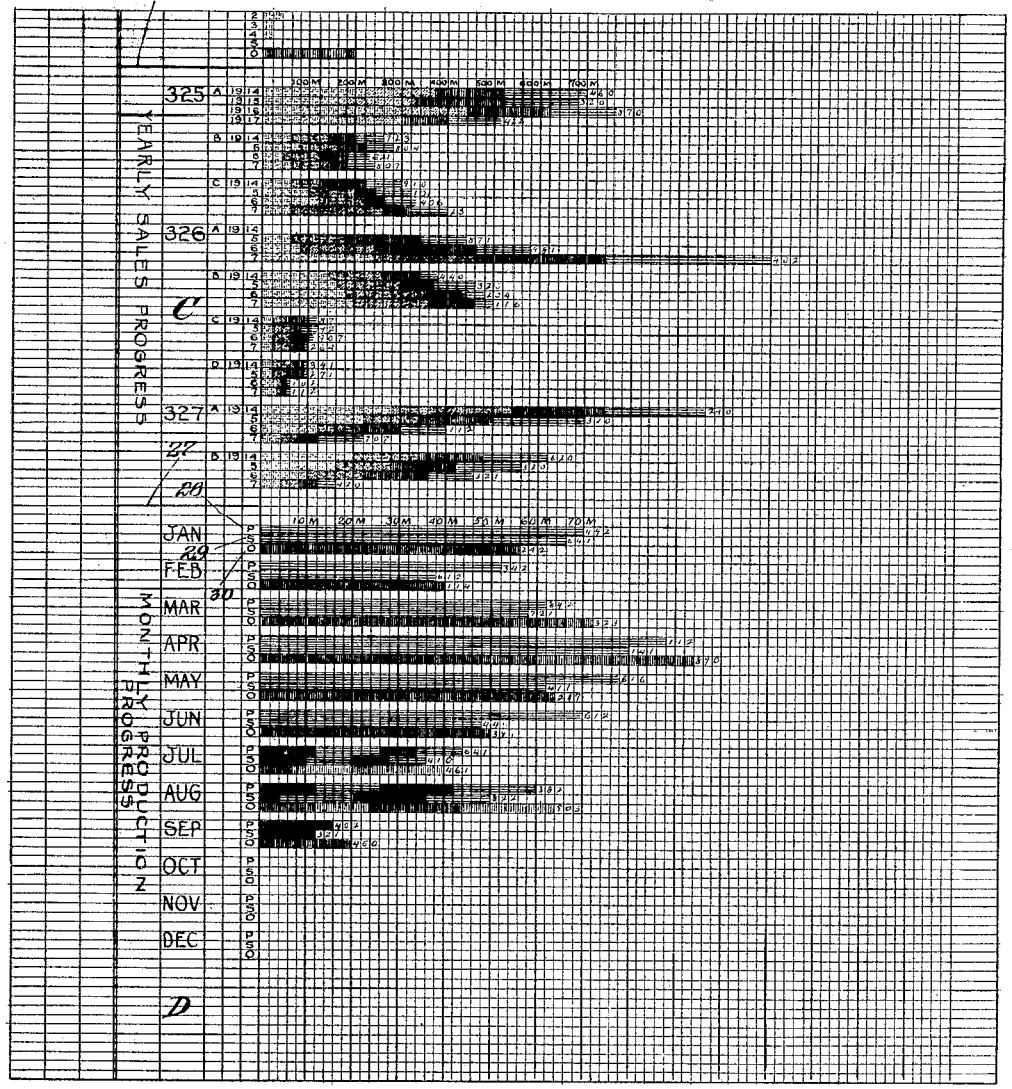

UNITED STATES PATENT OFFICE.

EVERETT H. BICKLEY, OF SOUTHBRIDGE, MASSACHUSETTS.

MEANS EMPLOYED IN PRODUCTION AND MATERIAL CONTROL SYSTEMS.

1,350,955.     Specification of Letters Patent.     Patented Aug. 24, 1920.

Application filed January 16, 1918. Serial No. 212,061.

*To all whom it may concern:*

Be it known that I, EVERETT H. BICKLEY, a citizen of the United States, and a resident of Southbridge, in the county of Worcester and State of Massachusetts, have invented new and Improved Means Employed in Production and Material Control Systems, of which the following is a full, clear, and exact description.

This invention relates to a chart for use in connection with a system for the control of production and material in a factory, although it is not necessarily limited to this use, as it can be applicable to wholesale houses or other mercantile requirements. The system is of such a nature that it will control everything from the stock and purchasing of raw material to the selling and carrying customers' reserve orders for special material. The system is so flexible that it will control and can easily be adapted to any kind of factory, regardless of the nature of the product.

The advantageous features of the system are as follows:

It prevents overstocking on raw, process, or finished material; provides material in proper quantities for the sales in hand without carrying excessive stock; prevents loading finished stock with styles that are dying a commercial death; allows the management to know accurately at a glance the condition of the entire plant on all viewpoints; provides an accurate basis of anticipating sales and production; indicates the condition of the manufacturing equipment; eliminates card index and ledgers, putting all the information before all in a way that a glance shows the complete condition; cuts out 40 per cent. of the clerical work; makes its own production, scrap, sales and stock reports; controls production of parts of various assemblies, in reference to the quantity of assemblies actually produced; allows for visible planning system down to the smallest operation on the smallest part if desired; keeps accurate record of all the parts in process, and shows their location; indicates the order and nature of operations through which each part must go; indicates what department performs the work and how many parts are in the department at any time; shows the total quantity of parts in operation; shows upon which parts work is being done; indicates at a glance which parts will be the first to tie up production, and how soon; points out necks in production; speeds up rush orders all the way through the plant; reduces the cost of supervision, in making conditions more easily controlled; shows just what operation defective work occurred on; controls all supplies incidental to the carrying on of the work; indicates the progress of the department as a whole referred to past performance; tends to simplify production problems and point out the best policies; gives the management constant supervision and approval of the department policies down to the smallest item; and takes the real control from the hands of the clerks of the index, and puts it into the hands of the proper parties.

For a detailed comprehension of the system reference is to be had to the following description and claims taken in connection with the accompanying drawings in which—

Figure 1$^A$ is a plan view of the upper half of the chart; and

Fig. 1$^B$ is a plan view of the lower part of the chart.

The invention presupposes an adequate system of getting information into the "department office," where a certain class of work will be controlled, showing the movements of the material. Local conditions and the class of material determine the method of handling this in the best way through receipts, time cards and coupon systems, machine counters or lot systems.

Referring to the drawing, the chart is composed of a raw material section A, a parts-in-process section B, yearly sales progress section C, and a monthly productions progress section D. Along the left margin spaces are provided for headings and subheadings, and the rest of the chart is divided up into small squares each having a numerical value for the purpose of recording the necessary data. At the right margin of the chart is a column X, headed by the word "Over," for carrying balances in figures, beyond the capacity of the chart.

In the present instance the chart has been made up as if used in the controlling of steel container production, and several forms and styles of finished products are contemplated.

At the top of the sheet or chart is the section B, represented with two controls of raw materials, such as steel "A" and steel "B," which designations are entered in the vertical columns 1 and 2, which are headed with the words "Part" and "Date," while the sizes or other designations are entered in the column 2. In a similar manner all other raw materials entering the products are charted. With each material two horizontal lines 3, 4 and 5 in the body of the chart, the first showing all receipts of material cumulatively since the beginning of the month or quarter-year to a suitable scale; second line shows all material of that particular size sent out to manufacture according to the same scale as the lay-out of line 3, and these two lines 3 and 4 are colored by filling in the squares with a blue pencil, for instance, and line 5, which is filled in with a red pencil, represents the cumulative orders received for finished styles. At the left end of the lines 3, 4 and 5 are the symbols +, — and O. The difference in the lengths of the + and O lines shows how the raw material stands with regard to orders; the difference between the + and — lines shows the stock on hand to be worked up, and the difference between the lengths of the — and O lines shows how much more material is to be started through the factory to clean up the orders on hand.

Next to the symbol column 6 is an "omission" column 7 with a heading OM, and in this column is a handicap entry, say, 6°, which represents 600 and means the minimum number of thousands of pounds of steel allowable before an order must be placed to insure more being received before that which is on hand is exhausted. This is a handicap imposed on the line indicating the receipts of raw material for the purpose of indicating the minimum limit for the stock to reach before ordering more material. When the lines become the same length it is time to order, and when the order is written a pin $a$, designated "order placed," is inserted at the end of the material received, line 3, and a pin $b$, designated "all out" is placed 600 units farther along. When material is received to complete the order the "order placed" pin is removed, until the lines 3 and 4 again come together. The pin $b$ is the warning signal. After the order is placed, the — line gradually approaches the $b$ pin, undue nearness indicating the necessity for investigation why this material has not been received. Receipts of material are entered in the + line and the "all out" pin is moved ahead likewise, as long as the — line is longer than the + line. When the + line becomes longer, the pins $a$ and $b$ are removed. The handicap can be changed with the condition of the market. A new raw material chart may be started at regular intervals, the lines being cut down to the shortest line of each kind of material on the new chart. By comparing chart with chart the rapidly used material can be picked out and steps for consolidating orders or covering on stock can be determined upon. The entries at the right ends of the lines are supposed to be written in pencil when the amount is less than a unit or square, and this number is added to the next shipment received.

Referring to the section B of the chart, it will be assumed that three forms are being manufactured as represented by the numbers 325, 326, 327, which numbers are arranged in the marginal part of the chart adjacent the body thereof and under the heading "Form," at 8. Each form is made up of several finishes, coverings or styles represented by the numbers $325^a$, $325^b$, $325^c$, $326^a$, $326^b$, $326^c$, $326^d$, and $327^a$, $327^b$, under the heading "Style," at 9. The form consists of two parts designated by K and M in connection with form 325. The part K is made in three operations, and for each a line 10 is reserved on the body of the chart, and these lines are successively numbered 1, 2 and 3, and the part M is made in four operations, for which the lines 11 are reserved on the chart and numbered 4 to 7. The eighth operation represents an assembling of the parts and for which the line 12 is reserved. The ninth is the finishing operation, and for which the line 13 is reserved. The squares of these various lines are filled in with a suitable color, say yellow, to represent the amount of work having undergone the various operations. The top line 14 of each group of operations indicates cumulatively all the orders issued for forms to be manufactured, and this line is designated by the plus symbol, and line 15 at the bottom of each group of operation lines is designated "P," and indicates the forms that have been ordered into the finishing department. This line 15 is preferably filled in with blue pencil, and under this blue pencil line is a red line $15^a$ designated by the symbol "O," which indicates the cumulative orders received for finished styles. The relative lengths of the lines from chart to chart or month to month show the relative quantities of the production. The differences in the ends of the lines at any time show the quantities of materials in process at any time, and the location is readily determined from the operation. The relative lengths of the K and M groups of operations show the quantity it is necessary to make more of K or more of M to balance evenly.

It should be pointed out that in the group of lines representing the "raw materials" one small unit square indicates 20000 lbs., in the "forms" one small square equals 1000 pieces. The scale at the top of the sheet is in thousands of pounds and does not apply to the "forms." These scales may be any unit desired.

Any operation continuously showing behind indicates a neck in production. The difference between operation 9 and the blue line shows the finished forms available at any time. The difference between the red and the blue indicates the condition of finished forms in regard to sales. A neck in production is any operation in a sequence, the capacity of which, in pieces per day, is less than other operations adjacent to it in the same sequence. A production neck causes a clogging and piling up of stock in front of this operation, and is shown by the difference in the length of the lines on the chart, as in form A 325, operations 1 and 2. There is a clogging indicated in front of operation 2, it appearing to lag behind operation 1.

Before the form numbers 325, 326, 327 is placed a letter to indicate from what raw material the forms are being made. Thus forms 325 and 326 are made from raw material steel "A," and form 327 is made from steel "B."

Along the left margin of the chart are three columns 16, 17 and 18, headed respectively "F scrap," "M scrap" and "Minus." Material that is scrapped is recorded and totaled in the "M scrap" column, and at the same time is taken off all the former operations performed, or at least recorded in the minus column to be deducted from the next operation coming through before being entered after the operations.

In connection with the operations "broken tool" and "new set of tools" pins $c$ and $d$ respectively are used to indicate when operations are interrupted by a broken tool or when an operation begins with new tools.

Referring to that portion of section B of the chart devoted to styles there are lines 19, 20, 21, 22 for various operations, and the + line 23 for "forms sent to finish" and indicates how many forms have been started through the finish. The length of the operation lines shows the progress. Additions are always made by coloring up the proper number of unit squares and carrying the exact balance in lead pencil beyond the end of the line. The length of the individual lines indicates the number of pieces having completed that particular operation since the date of starting the sheet plus the inventory at the time of starting the sheet. For continuous production the OM line can be used to handicap each operation with the minimum quantity of pieces necessary to keep the operation going properly. The effect of this is that the length of all lines be equal as to finished styles, parts and forms in operation, and raw material. This system of handicapping is desirable when the form of production is that of a large number of parts of varying number of operations going to make up one unit to be shipped, such as an automobile. The squares and the lines 19 to 23 are colored in yellow or any other suitable way, and under each group of these lines is a blue line 24 which indicates what is actually shipped to the customer, and the red line 25 indicates the orders.

When an entry is made in the — line for raw material, a corresponding entry is made in the + line under the particular form. When an entry is made in the "P" line under forms, a corresponding entry is made under the + line for the particular style. Thus the whole system is tied together and can be checked from start to finish any time by taking a count of parts on the operations under question.

All the orders for all the styles of a particular form will add up to the orders for that form. All the orders for forms made from "A" steel will add up to the orders for all "A" steel. The transfer of material from one point to another is made in one entry on the chart, as it goes from operation to operation. If there is a mistake in the figures it will quickly show up as looking wrong from the quantities on the previous operations. The fact that all movements of materials is so plain, many unnecessary movements will be eliminated by the mere installation of this system, as the unnecessary movements are brought to light.

Pins may be inserted in the chart at any point to indicate what is being worked on and what are rush orders, or errors, etc.

The section C of the chart relates to the yearly sales progress and is compiled from the monthly or quarterly record of the "parts in process" chart. This section contains in addition to the general heading column, columns for the forms and styles, and a column for the year numbers, and at each form or style entry are record lines of the sales for a year, each line being divided into quarters and each quarter having a distinguishing color. A study of section "C" "yearly sales progress" shows 325A is a good seller, but falling off in 1917. 325B is holding its own. 325C is picking up uniformly and gradually. 326A is having a big boom during the last quarter of 1917. From this chart it is easy to accurately estimate the first quarter of 1918 in advance.

The monthly production section D has a general heading column and a column with the months of the year, and opposite each month the lines 28, 29, 30 in the body of the chart are appropriated and they are headed respectively by symbols "P," "S" and "O," which respectively represent the total production of the department, the total shipment to customers, and the total orders received from customers. This is of course started with an inventory of unfilled orders, parts in progress and stock. This chart prevents a department from making a production showing simply to pile up stock to the maximum allowable over a multitude of various styles. It also speeds up the service on a shipment of orders. If desired the chart may be carried in quarterly periods, as represented in the months of July, August and September, where different colors are used for each week.

In operating this production system the pencil balance at the end of the line is always entered on the form from which the data is obtained, before it is erased or colored over.

Having thus described my invention, I claim as new and desire to secure by Letters Patent:

1. A chart containing a line designated to represent materials received, another line designated to represent materials removed, another line designated to represent orders received, the lines so distinguished that the difference in length is plainly shown, and suitable symbols at the ends of the lines to indicate the nature of the lines so named, the length of the lines representing quantities by suitable units, and any fraction of a unit being carried in figures at the end of the lines, all of the said lines being parallel and reading in the same direction from a common point.

2. A chart containing lines designated to represent certain acts with respect to materials, suitably laid out to indicate plainly the length or difference of the lines, in suitable units, indicating the quantities of materials acted upon, any fractional part of the unit being carried as figures at the end of the line, and suitable symbols at the ends of the lines to indicate the nature of the lines, all of the said lines being parallel and reading in the same direction from a common point.

3. A chart containing lines designated to represent materials, suitably laid out to indicate plainly the length or difference of length of the lines in suitable units, indicating the quantities of materials acted upon, any fractional part of the unit being carried as figures at the end of the line, and suitable symbols to indicate the nature of the lines, at the ends of the lines, and a column for indicating a handicap for each line, all of the said lines being parallel and reading in the same direction from a common point.

4. A chart containing a line designated to represent materials received, another line designated to represent materials taken from stock, another line designated to represent orders received, the first two lines being of one color and the third line of a different color, and +, − and O heading symbols at the ends of the lines in the order named, all of the said lines being parallel and reading in the same direction from a common point.

5. A chart containing a line designated to represent materials received, another line designated to represent materials taken from stock, another line designated to represent orders received, the first two lines being of one color and the third line of a different color, and a column at the left of the lines containing suitable designating symbols, and another column containing a handicap entry, pins, all of the said lines being parallel and reading in the same direction from a common point.

6. A chart of the class described having a heading portion, a body portion divided into units, columns for the entry of materials in the heading portion, a column for containing symbols for each entry of material, and another column for containing handicap entries for the respective materials.

7. A chart comprising a body divided into units in which lines are laid out to represent actions with respect to materials, a suitably designated column for entries for indicating the nature of the lines, a suitably designated column for containing handicap entries, a suitably designated column for parts and dates, a column for sizes of parts, a scrap column, and a minus column.

8. A chart comprising a body divided into units in which lines are laid out to represent operations on materials, a suitably designated column for entries for indicating the nature of the lines, a suitably designated column for containing handicap entries, a suitably designated column for parts and dates, a suitably designated column for sizes of parts, a scrap column, a minus column, said columns being arranged at one margin of the body, and an "over" column at the opposite margin for carrying balances in figures beyond the capacity of the chart.

9. A chart consisting of a sheet divided into a plurality of areas of predetermined denomination, said chart containing a line designated to represent materials received, a second line designated to represent materials removed, a third line designated to represent orders received, and each of said lines extending through the areas of predetermined denomination to indicate by their length the progress of their respective designating operation, and suitable symbols at the ends of the lines to indicate their respective nature, and any fraction of the total of one of said areas being carried in figures at the end of its respective line.

10. A chart comprising a body divided into units in which lines are laid out to represent operations on materials, a column suitably designated for entries for indicating the nature of the lines, a column for parts and dates, a suitably designated column for sizes of parts, a scrap column, a minus column said columns being arranged at one margin of the body, and an over column at the opposite margin for carrying balances in figures beyond the capacity of the chart.

11. A chart divided into a plurality of areas of predetermined denomination, said chart being furnished with a group of lines to designate a sequence of operations, each of said lines extending through said areas to indicate by the number of the areas covered, the quantities of operations performed, any fraction of the total of one of said areas being carried in figures at the end of its respective line.

12. A chart comprising a body divided into units in which groups of lines are laid out to represent related operations, a column suitably designated for entries for indicating the nature of the lines, a suitably designated column for sizes of parts, suitably designated columns for entries of scrap material, and an over column for carrying balances in figures beyond the capacity of the chart.

13. A chart comprising a body suitably divided for laying out lines in predetermined units of length, suitably designated columns for indicating the nature of the lines, lines laid out on said body in even units of length, and any fraction of the predetermined unit being carried in figures at the end of the respective line.

EVERETT H. BICKLEY.